(12) United States Patent
Thurston, III et al.

(10) Patent No.: US 11,361,477 B2
(45) Date of Patent: Jun. 14, 2022

(54) METHOD FOR IMPROVED HANDLING OF TEXTURE DATA FOR TEXTURING AND OTHER IMAGE PROCESSING TASKS

(71) Applicant: Weta Digital Limited, Wellington (NZ)

(72) Inventors: Kimball D. Thurston, III, Wellington (NZ); Luca Fascione, Wellington (NZ); Sébastien Nicolas Speierer, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/163,325

(22) Filed: Jan. 29, 2021

(65) Prior Publication Data

US 2021/0241502 A1    Aug. 5, 2021

Related U.S. Application Data

(60) Provisional application No. 62/968,120, filed on Jan. 30, 2020.

(51) Int. Cl.

| G06T 11/00 | (2006.01) |
|---|---|
| G06T 15/04 | (2011.01) |
| G06T 7/40 | (2017.01) |
| G06T 5/00 | (2006.01) |
| G06T 19/00 | (2011.01) |
| G06T 11/40 | (2006.01) |
| G06T 3/40 | (2006.01) |
| G06K 9/40 | (2006.01) |

(52) U.S. Cl.
CPC .............. *G06T 11/001* (2013.01); *G06T 7/40* (2013.01); *G06T 15/04* (2013.01)

(58) Field of Classification Search
CPC combination set(s) only.
See application file for complete search history.

(56) References Cited

U.S. PATENT DOCUMENTS

| 9,639,956 | B2 | 5/2017 | Krishnaswamy et al. | |
|---|---|---|---|---|
| 2008/0001961 | A1* | 1/2008 | Roimela | G06T 15/04 345/582 |
| 2011/0001756 | A1* | 1/2011 | Burley | G06T 15/04 345/587 |
| 2015/0130819 | A1 | 5/2015 | Peng et al. | |
| 2015/0199825 | A1* | 7/2015 | Capens | G06T 15/04 345/587 |
| 2017/0206700 | A1* | 7/2017 | Munkberg | G06T 15/005 |
| 2019/0122418 | A1 | 4/2019 | Peng et al. | |
| 2020/0027260 | A1* | 1/2020 | Harris | G06T 15/04 |

OTHER PUBLICATIONS

International Search Report for International Application No. PCT/US2021/015941 dated Apr. 14, 2021, 2 pages.

\* cited by examiner

*Primary Examiner* — Wesner Sajous
(74) *Attorney, Agent, or Firm* — Philip H. Albert; Destiny L. Stephenson; Haynes and Boone LLP

(57) ABSTRACT

An imagery processing system that combines MIP level filtering with spatial filtering when rendering images. Filtering can be performed in an order that optimizes memory accesses during the rendering process.

13 Claims, 7 Drawing Sheets

METHOD FOR IMPROVED HANDLING OF TEXTURE DATA FOR TEXTURING AND OTHER IMAGE PROCESSING TASKS

CROSS-REFERENCES TO PRIORITY AND RELATED APPLICATIONS

This application claims the priority benefit of U.S. Provisional Patent Application No. 62/968,120 filed Jan. 30, 2020 and entitled "Method for Combining MIP Level Filtering with Spatial Filtering During Texturing" is hereby incorporated by reference in its entirety as though fully set forth herein.

FIELD

The present disclosure generally relates to methods and systems for processing data used for rendering computer-generated images. The disclosure, in part, relates more particularly to apparatus and techniques for exploiting multi-threaded computing environments to pre-calculate filters to be applied for efficient rendering.

BACKGROUND

Many industries generate or use computer-animated features within an image or series of images. To render lifelike images, one or more texture tiles might be applied to a defined surface of a model. Multiple tiles can be coalesced together to account for color and material properties of what the surface represents, such as roughness topography and reflectivity. Texture engines read one or more tiles from storage, calculate one or more filter values to apply to the tile, and apply the one or more filters to the tile to account for lighting conditions of a scene where a ray trace extends from an audience view of the scene to the surface. This serializing technique of reading a tile, calculating a filter value, and applying the filter for many tiles is resource intensive, which results in extended render times or constrains the number of texture tiles read (effectively the size of a pixel region to apply a filter) or the number of filters calculated.

SUMMARY

A rendering system for generating rendered imagery, such as video sequences or still images, from computer-described objects can include applying a filter, calculating a fitted filter based on a determined impact of applying a filter across a range of tile vertices, accessing one or more tiles of one or more MIP levels determined to correspond to a pixel region selected for filtering, and applying the at least one fitted filter to the accessed one or more tiles. One or more fitted two-dimensional (2D) filters might be used, having various shapes. In some embodiments, a filter might be implemented as a filter kernel.

The fitted filter might be a first fitted filter and a plurality of fitted filters are calculated and accumulated in a cache before determining the one or more tiles of one or more MIP levels to access. In some embodiments, a bilinear filter might be collapsed or merged to allow for point sampling and correspondingly less computation and caching requirements.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
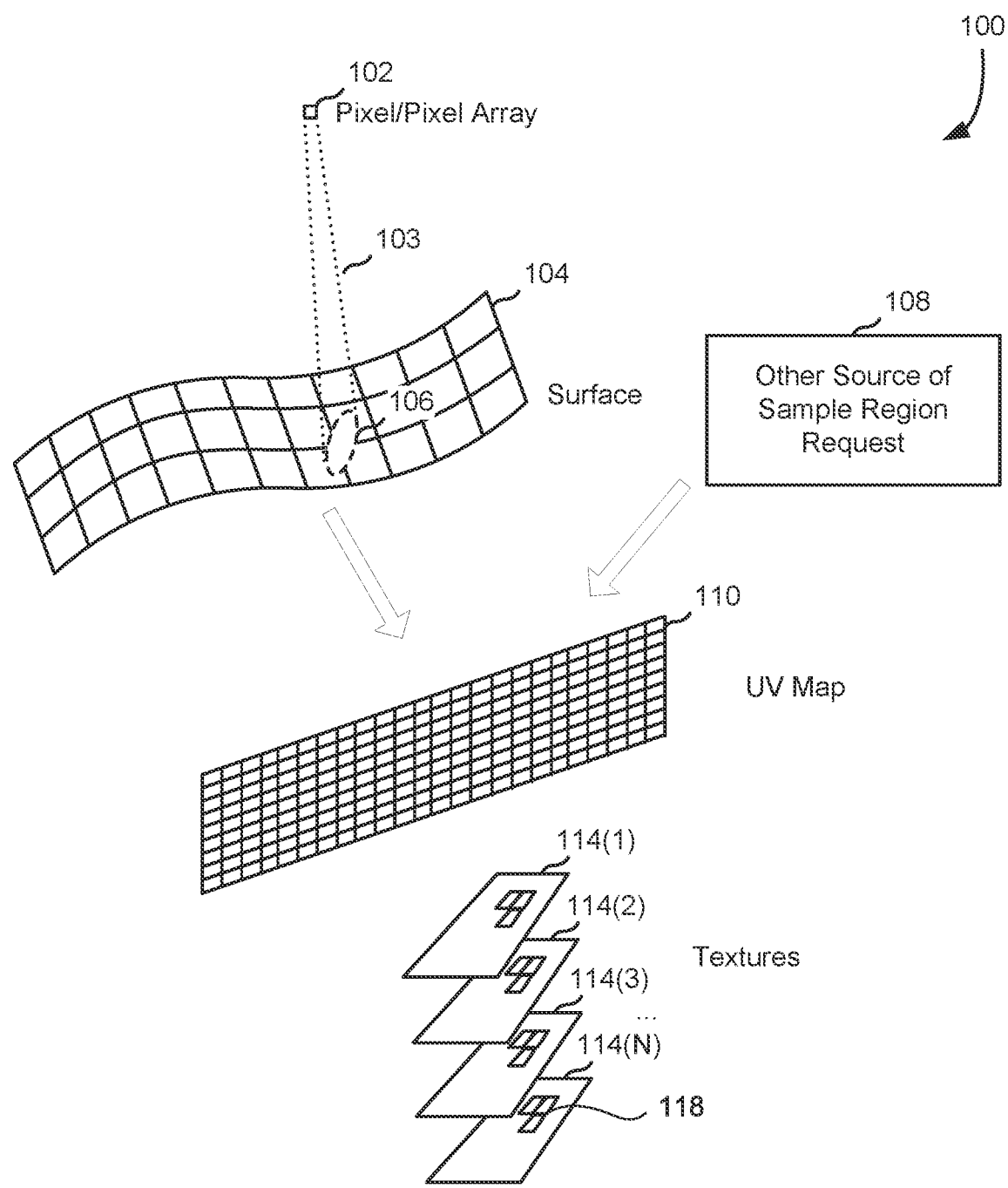
FIG. 1 illustrates an example 100 of where texturing might be done.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present disclosure describes techniques for efficiently processing data to generate imagery therefrom, wherein imagery might be one or more images representing real live action scenes, virtual scenes, or combinations thereof.

In some examples, objects in a scene can be represented in computer memory by a data structure defining a mathematical representation of a two-dimensional (2D) or three-dimensional (3D) physical item or character (e.g., a human, an animal, a fanciful being, etc.). To generate an image, a renderer, or other computer system, might read in that data structure, determine a position of a camera view point in a virtual space, the location and orientation of a camera view plane in the virtual space, and then use various techniques to determine what colors to assign to pixels of the camera view plane based on object location, light effects, etc. on the objects positioned in that virtual space. One approach to determining a pixel color for a pixel of the camera view plane is by ray tracing, wherein a computer process determines what would occur as a ray of light follows a path, interacting with objects in the scene, and intersects the pixel of the camera view plane and the camera view point, possibly simulating effects of the light ray's encounters with virtual objects. A "ray trace" might refer to such a path of light, which might be defined as beginning at the camera view point and ending at some object or beginning at some light source or object and ending at the camera view point.

The representation of an object might be stored as a mesh, wherein a mesh might be defined by a set of vertices and a set of edges between vertices, therein defining faces of the mesh and collectively forming a manifold of a boundary for the object. A texture for coloring that boundary might be provided. Faces of the mesh might be triangles or other polygons defining a shape of a polyhedral object representing the object for display or computer graphics modeling processes. In some examples, a scene can be represented as data structures referring to a virtual workspace for editing and/or rendering a 3D project. In some examples, an interface might be computer hardware or software designed to communicate information between hardware devices, between software programs, between devices and programs, or between a device and a user. Often, fine details are desired and an ability to generate imagery with those fine details without requiring tedious user input would allow for greater facility with such imagery.

In some examples, a scene defining an arrangement of virtual objects, light sources, effects, etc. in a 2D or 3D space can be represented in computer memory be data defining geometric models. A digital artist or other creator might use a computer interface to specify details of a scene. This might be in the form of a virtual workspace for editing and/or rendering a 3D project. Some objects might be specified by a small number of parameters, such as primvars or geometric primitive variables, such as points, lines, line segments, planes, circles, ellipses, triangles or other polygons, and/or spline curves. In some examples, primvars alternatively or additionally include spheres, cubes, toroids, cylinders, pyramids, and/or polygon meshes.

Portions of the scene might be described procedurally based on some primvars. For example, a spherical object might be represented in memory by primvars such as a center position, a radius, and a surface color, and a computer image generation system can generate imagery of that spherical object procedurally from the stored primvars.

In some examples, an "interface" refers to computer hardware or software designed to communicate information between hardware devices, between software programs, between devices and programs, or between a device and a user. In some examples, "communication" refers to a transmission and/or exchange of information. In other examples, a "display device" (also referred to as a "monitor" or "screen") refers to a device capable of representing information (e.g., words, numbers, drawings, images, etc.) visually (e.g., by a cathode-ray tube, liquid crystal display, light emitting diode, projection surface, etc.) that provides visual output from an image or video output device (e.g., computer, cable box, video camera, etc.). In some uses, methods and apparatus are used to generate the data of imagery, such as images in the form of arrays of pixel colors, with or without depth information, and/or a sequence of images forming frames of a video sequence.

In many cases, an object can be represented by a mesh that defines a closed and continuous surface. For texture mapping coloration onto that mesh for the object, a pre-computed set of textures might be used. That set of pre-computed textures might be computed at various resolutions.

"MIP mapping, or "mipmapping," is a process of pre-computing optimized sequences of images, at varying resolutions, representing the same image. A "MIP map" or "mipmap" may refer to a data structure that results from mipmapping, comprising a plurality of MIP levels. As a specific example, a mipmap might comprise pixel arrays of a texture for the exterior of a virtual building, such as a first MIP level that is a 128×128 pixel array, a second MIP level that is a 64×64 pixel array, etc., possibly down to a 1×1 pixel array with each MIP level having one-fourth the number of pixels as the next highest resolution MIP level. In other variations, the resolution steps between MIP levels might be different and might vary. The mipmap might be useful when generating a scene that includes the building. When the building is close to the camera, a higher resolution MIP level might be used compared with when the building is far from the camera and is going to affect many fewer pixels of the resulting image.

Images might be stored in a format wherein the image is subdivided into logical or physical blocks referred to as "tiles", such as square or other two-dimensional geometric shapes comprising four vertices.

As one skilled in the art will appreciate in light of this disclosure, certain embodiments can be capable of achieving certain advantages by utilizing parallel processing of computing filters and reading tiles, including some or all of the following: (1) decreasing processing time to render a compute-generated image for a specified image resolution, (2) improving resolution of a rendered image (e.g., reading additional tiles or calculating additional filters) for a specified processing time, (3) increasing scale of a filter (e.g. size of sampled pixels) that is applied within a specified processing time; and (4) improving application of one or more filters by pre-calculating filter functions independent of tile read/write operations, such that a cache of pre-calculated filters may be applied to an unconstrained quantity of tiles.

In general, a texturing process might involve determining, computing, or receiving an indication of a filter region and computing and storing, returning, or transmitting a resultant output texturing data value. That output texturing data value could represent a color value or it could represent something other than color. An output texturing value might be a scalar value or a vector value. The filter region might correspond to a set of points or positions that correspond to a view from a pixel in screen space, a voxel, or something else. Often determining an output texturing data value is part of a process wherein many output texturing data values are determined. A texture dataset can be a file, stream, and/or computed set of values, that correspond to an array of texture values, or texels. A texture dataset can be read from some memory, or over a network, or perhaps computed on the fly from a set of texture parameters.

In a very specific example, in an image rendering of an object into pixel color values in a screen space, a portion of a surface of the object in a virtual scene space that covers a pixel is determined, that portion might be mapped onto a UV map of the surface of the object, a texture dataset is read to determine the values for that portion of the UV map, a filter kernel is computed that represents relative weights of texels of a texture dataset, and weighted texels from the texture dataset are aggregated, such as by summing, to arrive at the resultant output texturing data value. This process can be performed using several textures if multiple texture datasets are to be used to influence the resultant output texturing data value. This process can be repeated over several pixels, such as where an entire view of the object from a camera position is to be computed. A filter kernel might correspond to a weighted sum of neighbors around a particular location and might correspond to interpolating results between two resolution levels.

In one example, the filter region is determined by projecting a disc (or other shape) onto a surface at some orientation and distance. The projection might be a slice of a cone, such as an ellipse. Filtering might be applied at the intersection of the projected shape and the surface to approximate that intersection, possibly adjusting to avoid aliasing. The filter region might be a small area covering multiple texels as necessary.

A texture dataset might include multiple prefiltered resolution levels of detail. A multilevel resolution texture dataset might comprise a texture image at a first level, a texture image at a second level that is a lower resolution than the first level texture image, a third level, and so on. It might be that the resolution drops by some factor from one level to the next and drops in each dimension, as in a MIP-map data structure. That resolution could be a factor of two or some other factor. The resolution might drop by the same factor in each dimension, as in a MIP-map data structure, or by different factors for different dimensions, such as a RIP-map data structure. In some variations, wavelet data structures might be used or some other encoding wherein higher resolution levels build on lower resolution levels. However, a texture dataset with a single level of detail could also be used. A texture dataset might comprise 2D arrays of values for a surface texture, but could comprise a different number of dimensions, such as a 3D array of values for a volume texture.

In many instances, there are multiple textures that need to be taken into account and they might not be aggregated into a single texture dataset. For example, a rendering process might rely on one texture dataset representing a base color and another texture dataset representing a "shininess" component. Other examples include a roughness texture, a "rust" texture, etc. A moderately complex scene might involve objects that are textured with dozens or hundreds of textures being sampled for each virtual hit point. In some cases, a texture dataset comprises a large number of texels and only a small number of them are needed for sampling. It may be that the relative positions of the texels being sampled are determinable and are mostly the same for each texture dataset being considered and it may be that the texels of a texture dataset are organized into tiles (such as 32×32 arrays of values) and it may be that the same tile locations with each texture dataset are used and not used, each typically having different tile values and kernel weights to sample those tile might be the same.

In some variations, post-aggregation filtering is applied to the resulting output texturing data values. In some variations, the post-aggregation filtering could be applied to the filter kernel that is used before the computation of the output texturing data values. For example, a transform operation and/or a blur operation that might be applied in compositing might be applied to the filter kernel in the texturing process. Other examples include interpolation across a grid and filtering between MIP levels).

As explained herein, the filter weights of the filter kernel might be used over and over and thus computing them and storing them for later use can save on computational efforts. Also, for a given filter region, the tile selection for texture datasets might be the same over multiple texture datasets, so computing them and storing them for later use can save on computational efforts. Computation of the filtering kernel can be separated from step of texture dataset access. By caching kernel weights in a sparse grid, for example, for reuse when the filter region is same might reduce a need to recompute filter weights, tiles needed, etc.

A texturing process or system might schedule and store what tiles are needed for a particular sampling operation, which might allow the process or system to batch requests for tiles against a file load. This can reduce thread contention. If the different texture datasets being sampled have similar MIP level layouts, the process or system can request the appropriate tiles from a cache or a source such that the requests are more ordered. In a specific embodiment, the requests are ordered to result in reading from a file in a linear fashion.

FIG. 1 illustrates an example 100 of where texturing might be done. The visual elements depicted there might be represented by data structures stored in memory or storable in memory that can be processed using steps described herein. A texturing process might be executed to determine a color value or other value for a pixel 102 (or an array of pixels) that is to be driven by one or more textures associated with a surface 104 in a scene. In some rendering processes, a ray is drawn from a pixel into the scene until it intersects some object. In other processes, texturing proceeds as if a cone 103 (or some other expanding volume) is emitted from pixel 102 until it intersects surface 104. An intersection of cone 103 and surface 104 might be defined as a surface pattern 106, which might be an ellipse, a quadrangle, or other shape. Perhaps points on surface 106 correspond to coordinates on a texture. In this example, texturing involves a plurality of textures 114 and within a texture 114(1), a subset 118(1) of texels of texture 114(1), are used to determine values for pixel 102 and other texels are not. Depending on the bounds of the texels and the shape of surface pattern 106, some weighting function might be applied to the texels that are in subset 118(1).

In a more general case, the texturing operation determines a sample to return for a sample region that might be a region represented by a pixel's extent on a surface that is in turn mapped to a UV map 110 for textures, or simply some filter region representation comprising computer-readable data corresponding to a sample region of a virtual mapping to be sampled. Textures and kernels can then be computed for that filter region. In some embodiments, the filter region is specified as the centroid of an ellipse, the direction of at least one axis, and the magnitudes of the major and minor axes. The filter region might be derived by mapping a surface in a virtual space onto UV map 110, but it might be derived from some other source 108 and specified in a request for a sample.

In a particular process, the operation might comprise determining a first texture dataset, determining a filter kernel for the filter region representation, the filter kernel corresponding to the sample region, wherein the filter kernel comprises one or more kernel weights over the sample region, storing the filter kernel, determining a subset of the first texture dataset upon which the filter kernel is to be applied, storing a schedule of the subset, wherein positions of texels within the first texture dataset are determinable from the schedule, applying the schedule and the filter kernel to the first texture dataset to determine a first texture contribution for the sample region, determining a second texture dataset, applying the schedule and the filter kernel to the second texture dataset to determine a second texture contribution for the sample region, and combining the first texture contribution and the second texture contribution to determine an overall accumulated output for the sample region as the sample. Methods herein that describe using surface patterns could be used for other filter region representations.

In some embodiments, textures might be stored such that the first texture dataset and the second texture dataset are part of some larger data structure. Those textures might be for different channels within that texture data structure, such as two or more color value channels, an alpha channel, or some other arrangement. A texture dataset might be one or more of a plurality of texture components or channels, perhaps less than all available components/channels.

In one approach, a texturing processor will compute a shape of cone 103 based on pixel position, distance, etc. and compute surface pattern 106 based on pixel position, distance and shape of surface 104 at intersecting locations. The texturing processor can compute which texels are needed to compute a texture for pixel 102 based on, perhaps, the shape of surface 104 and a mapping (such as a UV mapping) of texels from a texture 114(1) to surface pattern 106. The texturing processor can also compute a filter to use for pixel 102 and texture 114(1) that corresponds to the weights of the texels. For example, where the texturing processor computes an overlap of surface pattern 106 and texels of subset 118(1), some portions of some texels might be outside the pattern and thus assigned a weight of less than 100% the weight assigned to other texels.

Where there are multiple textures that are combined for depicting a surface or for computing surface values, the texturing processor could compute, for each pixel, a surface pattern, and from there a filter pattern, and then retrieve a texture dataset to determine texel values to combine and repeat this process for each texture. That can require considerable computational effort.

For more efficient texture processing, the texturing processor can store or cache a filter and can store or cache a texture schedule that indicates which texels of a texture are used. In the example illustrated in FIG. 1, there are multiple textures 114 that are combined for determining values within surface pattern 106 and if the textures have a common coordinate system, the locations of the texels used in one texture might be the same as the locations of the texels used from other textures. If a schedule of texels is stored, it might need be computed only once for a given surface pattern, saving computational effort. Furthermore, if textures are stored in data structures that are retrieved from memory using multiple memory accesses, a memory request can be for less than the entirety of a texture dataset, thus saving memory access bandwidth. In such cases, the texturing processor might read only those texels that are represented by a schedule of texels and use that schedule for several texture datasets. Additionally, if the textures are stored as multiple levels of MIP-MAP data, the schedule of texels might indicate what MIP-MAP level is needed, further saving memory accesses as the texturing processor can make smaller memory requests, just for the levels that are needed.

Further efficiencies might be available by storing or caching the filters and texel subsets from pixel to pixel.

Figure 2:
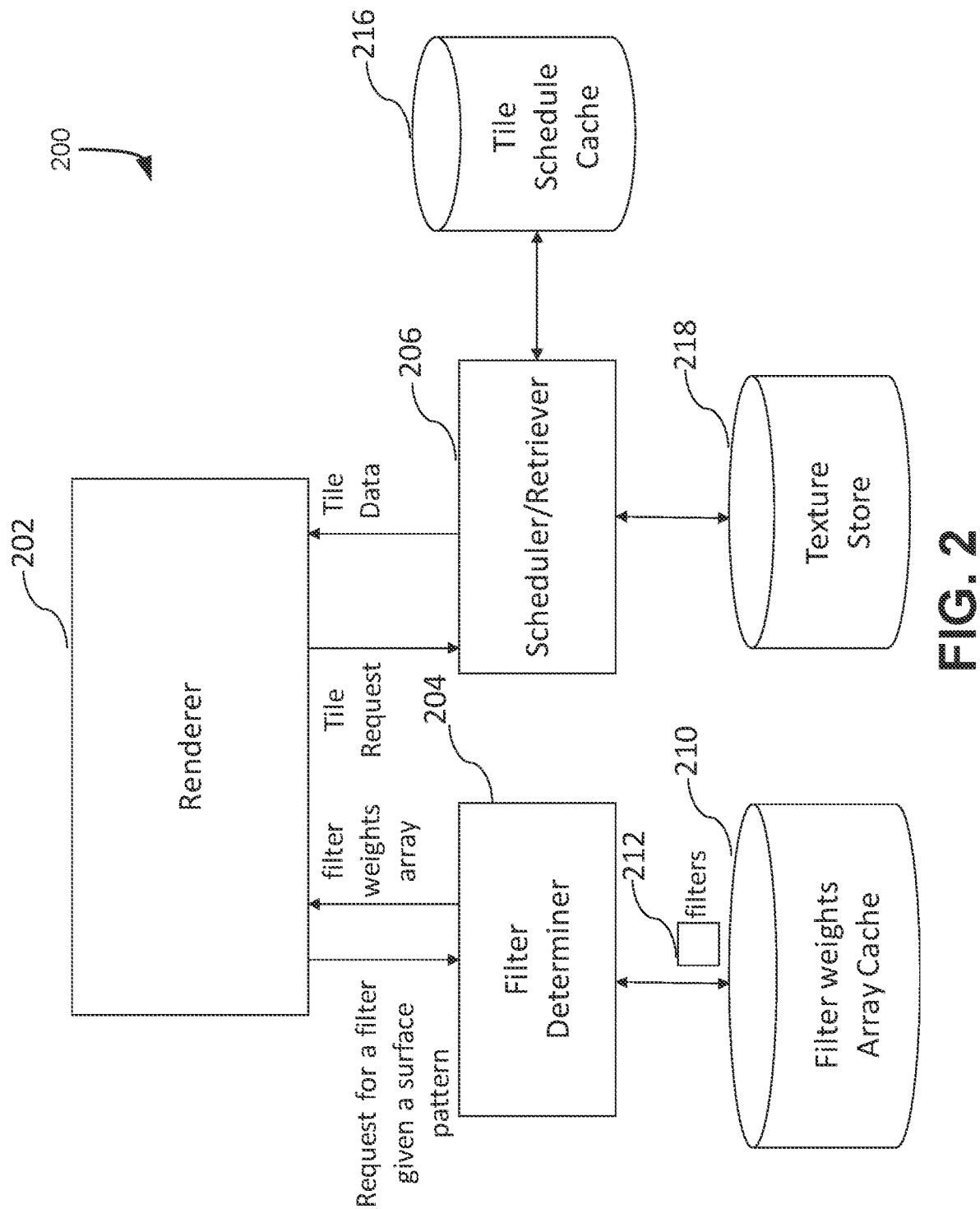
FIG. 2 illustrates an example of a texture processing system 200 as might be used for embodiments of texture processing.

FIG. 2 illustrates an example of a texture processing system 200 as might be used for embodiments of texture processing. In that example, a renderer 202 connects to a filter determiner 204 and a scheduler/retriever 206. In an operation for determining a pixel value, such as a pixel color value, renderer 202 might determine a set of texels from one texture, apply filter weights to those texels, determine a set of texels from another texture, apply the filter weights to those texels and sum contributions (or perform some other operation) to determine a pixel value over a plurality of textures. To determine a filter to use to weight texels of a texture, renderer 202 might make a request of filter determiner 204, which might read in a filter 212 from a filter weights array cache 210 or compute filter 212 and store it in filter weights array cache 210 while providing it to renderer 202. In other variations, renderer 202 computes filter 212 and provides it to filter determiner 204 which simply acts as a cache.

With a filter in hand, or before, renderer 202 cam make a request for texture tiles from texture datasets to scheduler/retriever 206, which can obtain those tiles by reading from a tile schedule cache 216 to determine which tiles to request from a texture store 218. In a case where there might be several dozen textures to combine, renderer 202 might receive the same filter weights array for each of the textures and the texels received from each of the textures might be the texels from the same positions, per the stored schedule. Where many textures are processed, and/or high-resolution renders are performed, such caching and such reusing can save considerable computational effort and considerable bandwidth.

Figure 3:
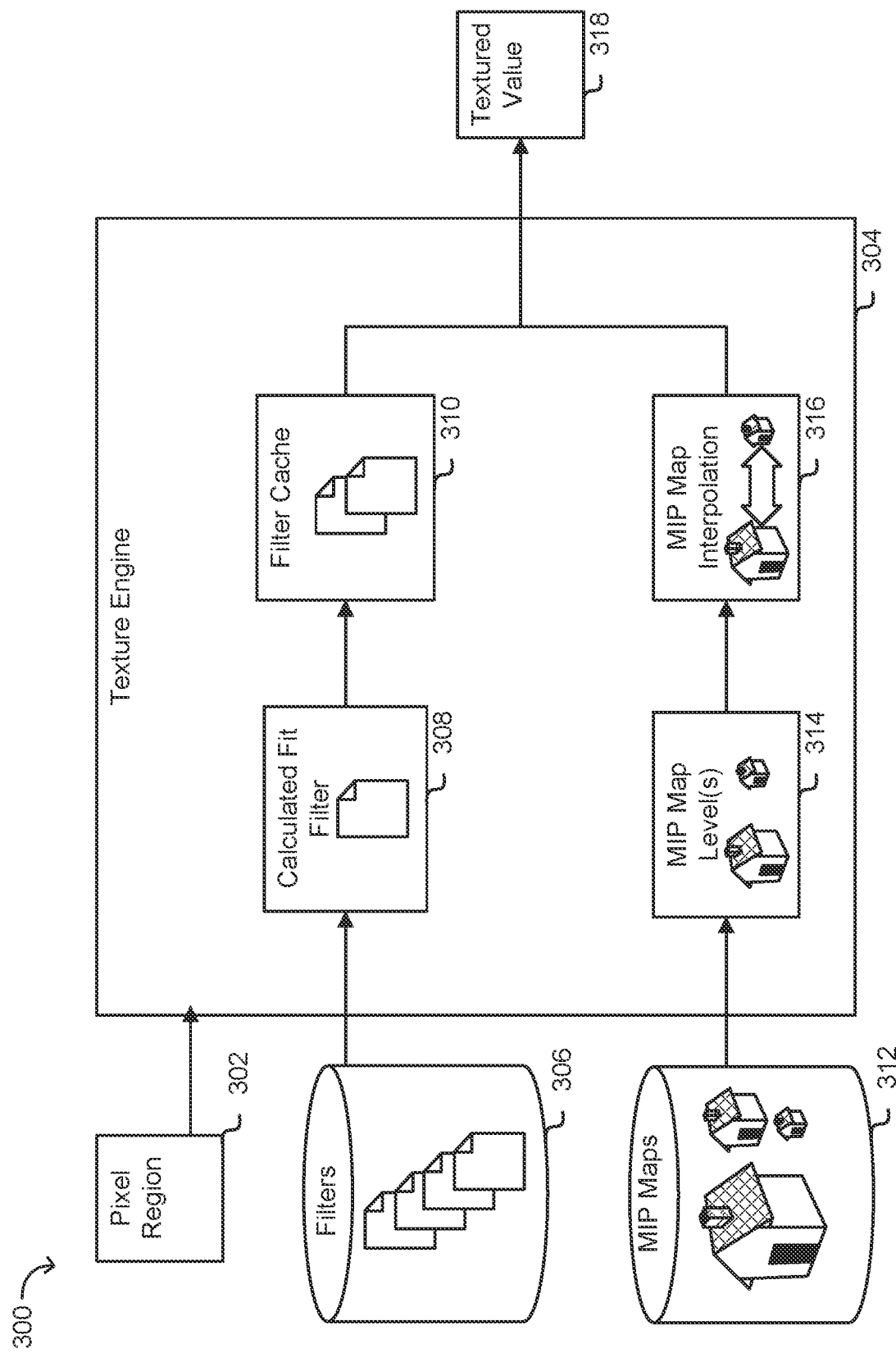
FIG. 3 is a block diagram illustrating an embodiment of a system in which a texture engine of a computing system may process a sampled pixel region by determining MIP maps of a tile and applying a precomputed filter.

FIG. 3 is a diagram of a data flow through a system 300 when the system 300 is performing a process 400 (see FIG. 4) that calculates a filter value for a computer-generated image. A user may select a pixel region 302 for applying one or more filters of a plurality of filters 306. A pixel region 302 may be sampled from an image file accessible to the texture engine 304. In one example, a filtering service operating in connection with the system 300 provides a web service application programming interface to which web service application programming interface (API) calls can be submitted to the texture engine 304 for processing an indicated pixel region 302.

A pixel region 302 may be a region within a ray trace extending from a light source indicated within a graphical environment, reflecting off a surface of a modeled object, and extending to a viewing position of the graphical environment associated with an audience's perspective of the reflected surface. The process 400 (see FIG. 4) uses parallel filtering and tile read/write (input/output) to apply one or more filters to one or more tiles associated with a surface of a modeled object. The system 300 may be configured to decouple filtering and tile read/write, thus improving real-time processing and/or processor efficiency.

The system 300 is shown including a texture engine 304, a repository for a plurality of filters 306, and a repository for a plurality of MIP maps 312 corresponding to a tile for a texture to be applied to a surface within a pixel region 302. The texture engine 304 may be part of one or more rendering or animation pipelines. The texture engine 304 may be configurable by at least one client computing device operated by at least one human artist. The texture engine 304 may be implemented by software executing on a computer system (e.g., a computer system 600 illustrated in FIG. 6). The software may include Houdini™ software tools developed by SideFx, Maya™ software tools developed by Autodesk Inc., and the like. The software might also include a proprietary renderer and/or a commercially-available renderer with custom plug-ins or components.

The texture engine 304 is configured to receive a pixel region 302, one or more filters 306, and one or more MIP maps 312 as input. A pixel region 302 may indicate reflected light from a surface, such as determined by a ray trace. A filter of a plurality of filters 306 may include a function including Gaussian, Lanczos, Mitchell, Blackman-Harris, and the like. A function of a filter may be parametric to minimize error or aliasing when applied to a texture MIP map. A function may be separable to reduce multiplication operations when the texture engine 304 computes applying a filter function. A function may also be an arbitrary non-separable function. A function might be a bi-cubic function, or a noon-symmetric 2D Gaussian filter. A function might be separable in that it can be applied in one dimension and then in the other dimension.

In an embodiment, a texture engine 304 accesses a filter function from a filter repository storing a plurality of filters 306. A texture engine 304 may be capable of multiple thread processing such that the texture engine 304 may make multiple calculations synchronously. In an embodiment, a texture engine 304 may determine a filter to apply to increase audience perceived sharpness of a low-resolution texture designed for an audience to view when the sampled pixel region corresponds to a closer perceived distance than a viewing position from which the sampled pixel region represents. In an embodiment, a texture engine 304 may determine a filter to apply to decrease audience perceived sharpness of a high-resolution texture designed for an audience to view when the sampled pixel region corresponds to a farther perceived distance than a viewing position from which the sampled pixel region represents.

Based on a filter selection, such as specified via an interface of a texture engine 304 by a user, the texture engine 304 may perform a fit step or analysis of an impact of applying the selected filter across a designated range of vertices for the sampled pixel region 302.

For example, the texture engine 304 could combine multiple filters into a combined filter and use the combined filter, which would improve efficiency over running each filter separately and can improve accuracy by not accumulating errors values over multiple filter steps.

Based on the results of the fit step and using the selected filter function, a texture engine 304 may calculate a fitted function 308. A fitted function 308 may represent fitting two or more function parameters together, allowing the texture engine 304 to interpolate between any neighboring MIP levels. A fitted function 308 then avoids hard-coded constants for a specific sized MIP level. A desired primary filter might correspond to a projection of a desired sample onto a rectilinear grid, usually interpreted as a slice of a conic section, yielding an ellipse—although other projections are possible. Filters, such as from a bilinear sample or similar to approximate sub-pixel accuracy, might be layered on top of that to account for aliasing of the rectilinear grid, or other effects. Filter samples might be later interpolated further down a pipeline on vertices of a model that can be projected backward and modeled. By fitting multiple filters, the texture engine 304 can combine multiple filters into a new and possibly arbitrary filter that can be cached and reused, thus avoiding the need to recompute the fitting.

A fitted function 308 may be aligned with a filter shape, such as applying a Gaussian for an elliptical, spherical, or slender filter for a tile. Alignment may be processed to account for possible rotations of a filter (e.g., diagonal) as processing may apply to a two-dimensional range of vertices. A texture engine 304 may add a calculated fit filter to a filter cache 310. A texture engine may calculate additional fit filters, such as an initialization step or while waiting for tiles of MIP map levels 314 to be read into a buffer by other thread processes of the texture engine 304.

A pixel region to be filtered may be received by a texture engine 304 in an API call request. The API call might be made by some other process that is responding to a displacement or other action that desires to determine surface properties (e.g., colors, light transport behavior, etc.). The request may be in the form of a shading language call, such as a RenderMan Shading Language (RSL) call, a Houdini VEX Shading Language (VEX) call, a Gelato Shading Language call, an Open Shading Language (OSL) call, an OpenGL Architecture Review Board (ARB) call, an OpenGL (GLSL) call, an Nvidia™ Cg call, a DirectX Shader Assembly Language call, an Adobe Pixel Bender call, an Adobe Graphics Assembly Language call, a PlayStation Shader Language (PSSL) call, an Apply™ Metal Shading Language (Metal) call, or the like.

An initialization step for processing one or more tiles may include verifying that the texture engine 304 has sufficient buffers allocated based on a grid size of the sampled pixel region 302. In an embodiment, an individual core of a plurality of cores in a computer system 600 may be tasked with processing an individual grid, such that the computer system 600 may process multiple grids synchronously as each core synchronously processes a different grid. An initialization step may not be repeated when a plurality of texture requests corresponds a region within the same grid. For example, if a texture request for a surface of a modeled object is a painted car, then a texture request for a region of the car can share the same initialization step for filtering the color of the car, flakiness of the paint, glossiness of the paint, severity of rust, etc.

Based on an indicated pixel region 302, a texture engine 304 may read a texture dataset from storage. A texture dataset may indicate one or more MIP map levels 314 to access and obtain corresponding tiles in a repository for MIP maps 312. When a view represented in a sampled pixel region 302 would correspond to a resolution between neighboring MIP map levels, a texture engine 304 may interpolate between the two levels to achieve an intermediate MIP map 316.

A texture engine 304 may perform an accumulation once all tiles corresponding to the sampled pixel region 302 are retrieved. A texture engine 304 may iterate a cache of fitted filters 310 over the obtained tiles. An iteration may include loading a tile into memory, performing one or more Streaming SIMD Extensions (SSE) operations to the tile based on one or more fitted filters, and returning an output textured value 316. Utilizing SSE operations in this manner facilitates a relatively quick multiple/add calculation compared to calculating a function or fitted filter to apply to a tile as the tile is loaded into memory.

Figure 4:
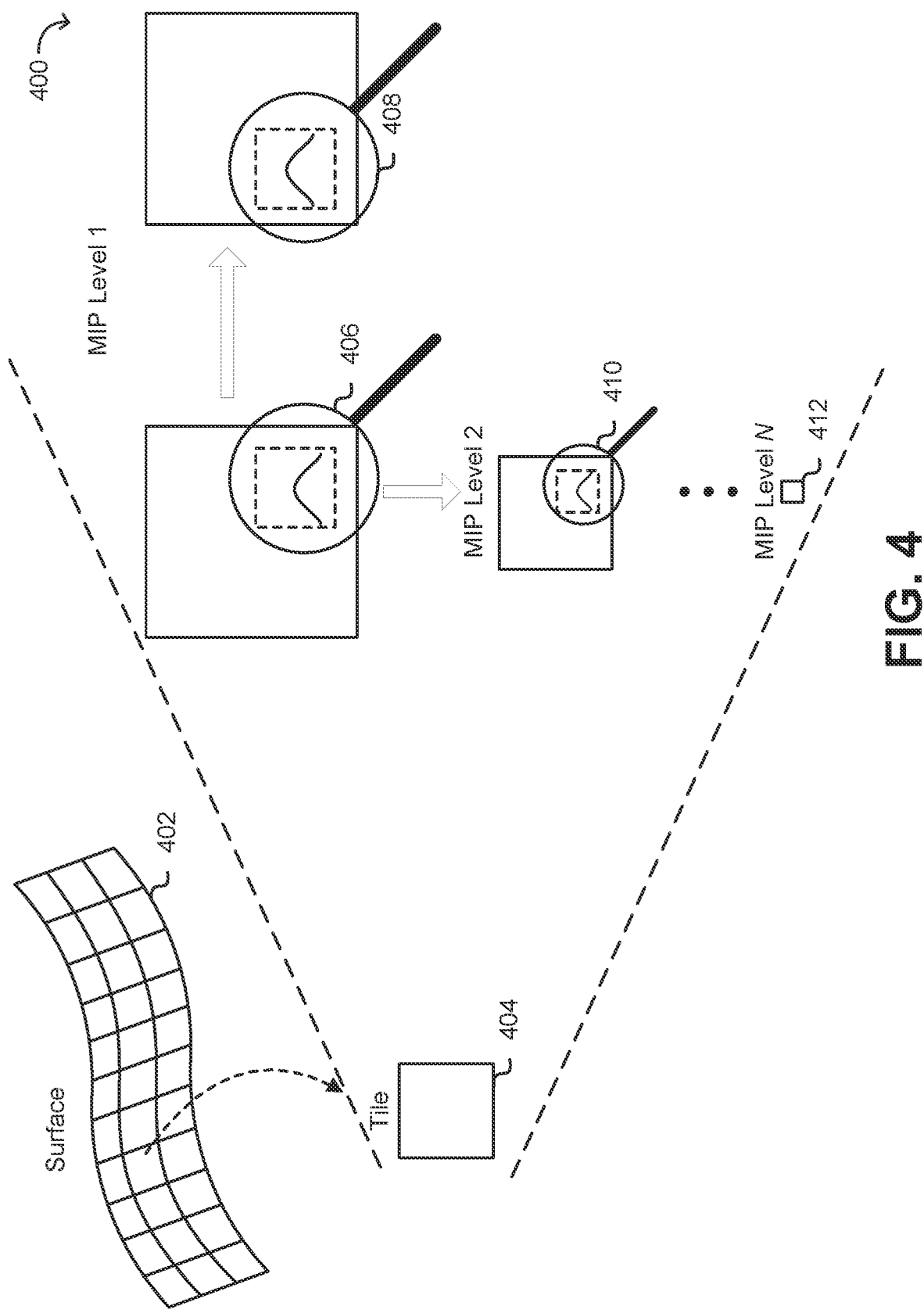
FIG. 4 is a block diagram depicting an embodiment of the process illustrated in FIG. 3, including applying a filter to a series of tiles within and across MIP map levels.

FIG. 4 is a block diagram illustrating a process 400 of how a series of MIP map levels may be synchronously processed with a fitted filter. For a given surface 402 comprising a plurality of tiles, a tile 404 may be selected for processing, such as based on a selected pixel region 302 as described above.

To apply a filter to a grid, a corresponding range of vertices is divided by the texture engine into pieces. In an embodiment, each piece is available to a thread for processing. A texture engine, such as texture engine 304, may determine identifiers of a texture to be retrieved from a thread contribution list. Identifiers may indicate properties of a virtual material corresponding to a surface of an object represented in a sampled pixel region 302, such as color and reflectivity.

A texture engine, such as texture engine 304, may determine a sub region to apply a filter. A subregion may be a single point, also implying that for a single point there are four surrounding vertices of the point within a given MIP map level. When a texture engine determines that a resolution corresponding to a perceived distance from a camera position to a surface including the subregion corresponds between two MIP map levels, at least the four surrounding vertices of the subregion point for a higher level 406 and a lower level 410 may be obtained by the texture engine. The texture engine may determine which additional tiles to access for a selected region and subregion to include straddled tiles, such as for tile 408.

As a fitted filter may be pre-calculated for a grid, applying the filter to tiles 406, 408, and 410 may occur synchronously.

Figure 5:
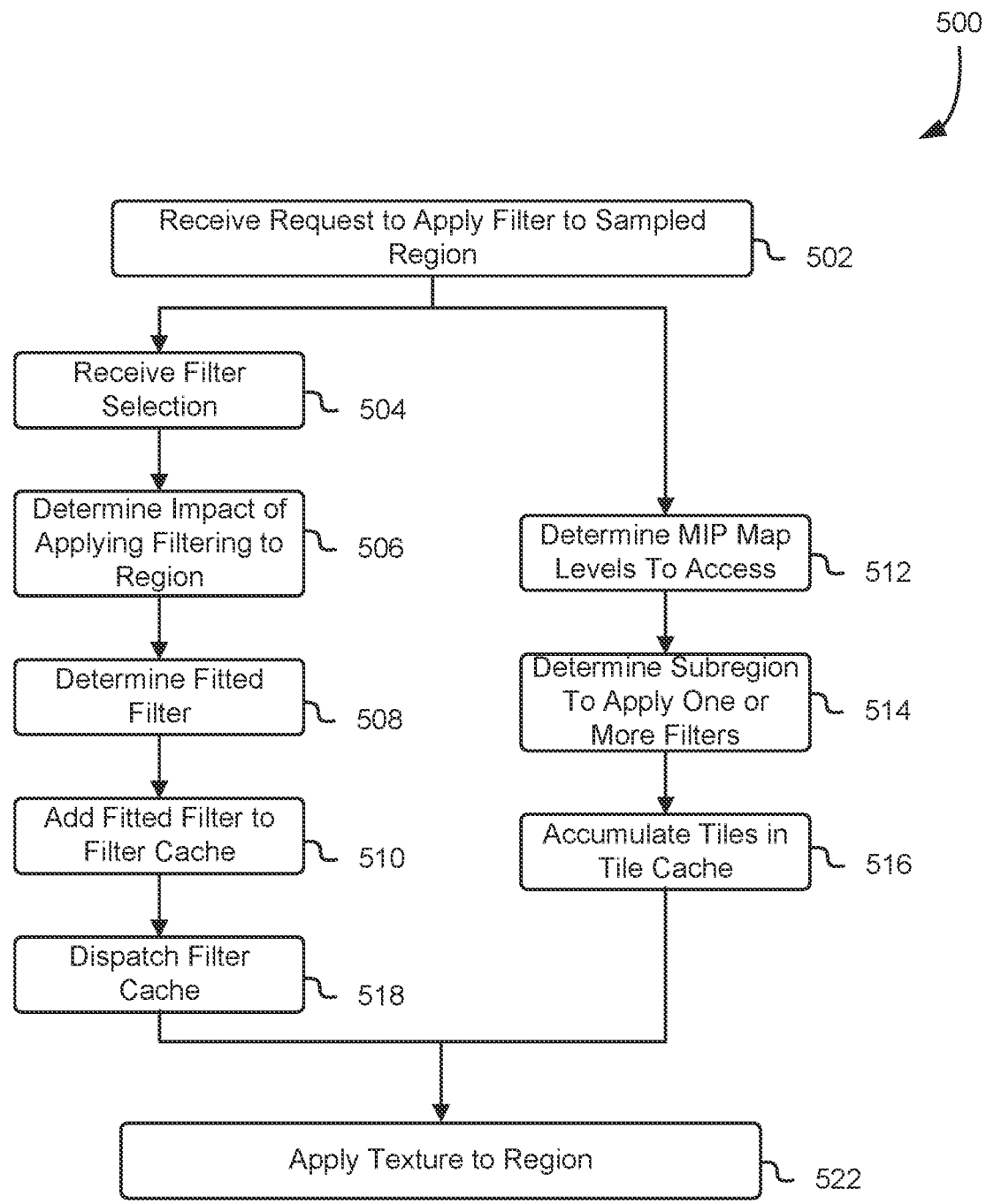
FIG. 5 is a flow chart depicting a process for applying a texture to a tile.

FIG. 5 is a flowchart of the process 500 that may be executed by the system 300 of FIG. 3 and used to apply one or more filters to a tile. Referring to FIG. 5, a texture engine receives 502 a request to apply a filter to a sampled region. As described above, a request may include an API call and may be formatted in a shading language. A texture engine bifurcates the work flow process.

When the texture engine receives 504 a filter selection, the texture engine retrieves the selected filter function from a repository of filter functions. Then the texture engine determines the impact of applying the filter to the sampled region. Based on the impact of applying the filter, the texture engine determines 508 a fitted filter for the sampled region. A fitted filter may comprise two function parameters such that it is possible for the texture engine to re-interpolate between any neighboring MIP levels. In computing a fitted filter, a texture engine may align a selected filter function to account for any rotation of a region to which the selected filter is to be applied. The texture engine then adds 510 the fitted filter to a filter cache.

The texture engine determines 512 MIP map levels to obtain from a MIP map repository. The texture engine may obtain MIP maps for neighboring levels. The texture engine determines 514 a subregion of the sampled region to apply one or more filters. The subregion may be a point, indicating that a range of vertices, such as for a particular patch, be divided into pieces at least corresponding to a range of four vertices immediately surrounding the point. The texture engine loads 516 the corresponding tile associated with the subregion into a tile cache.

In some embodiments, the texture engine can perform an offline process that performs an analysis step of determining effect on an image and fitting to interpolation parameters, which can allow for the use of an appropriate MIP map level. The texture engine might receive an input requesting some texture operation. The texture engine might allocate sufficient memory to perform the requested operation and then perform a step of dispatching a process to compute filter regions, perhaps in a multithreaded method. A range of vertices might be treated as a patch that is processed by a thread of a plurality of threads.

In processing a patch, a thread might compute, for each vertex in the patch, which tile IDs are needed for that vertex. Then, the thread might compute what subregions are being considered and record kernel values. The texture image might wait for the threads to finish and then cache the tiles. While the input/output processes are occurring, threads might work on other processing. When processing a grid, one thread might be processing one grid to process, but that thread can also evaluate a shading function and the texture engine can keep a local cache of shading values. Filter weights might be computed by combination of different filters. By optimizing the thread process, texture processing can be performed using less computational effort.

Caching and overlapping allows for computation to be provided for other purposes. Combining filters can also save on computational effort. Some of the filters might be parametric functions.

In step 518, the texture engine dispatches the filter cache to be applied to accumulated tiles. The texture engine then applies 520 the fitted filters to the tiles in the tile cache. An iteration of applying a fitted filter to a tile may include loading a tile into memory, performing one or more Streaming SIMD Extensions (SSE) operations to the tile based on one or more fitted filters, and returning an output textured value as described above.

Note that if a threshold of tiles has accumulated in the tile cache corresponding to the sampled region, thread processes currently assigned to accumulating tiles (steps 512-@f3@16) may be reassigned by a load balancer to contribute to thread processes for calculating one or more fitted filters (steps 504-@f3@10) corresponding to the sampled region or another sampled region. Similarly, if a threshold of fitted filters have accumulated in the filter cache corresponding to the sampled region, thread processes currently assigned to calculating filters (steps 504-@f3@10) may be reassigned by a load balancer to contribute to thread processes for accumulating tiles corresponding to the sampled region or another sampled region.

Figure 6:
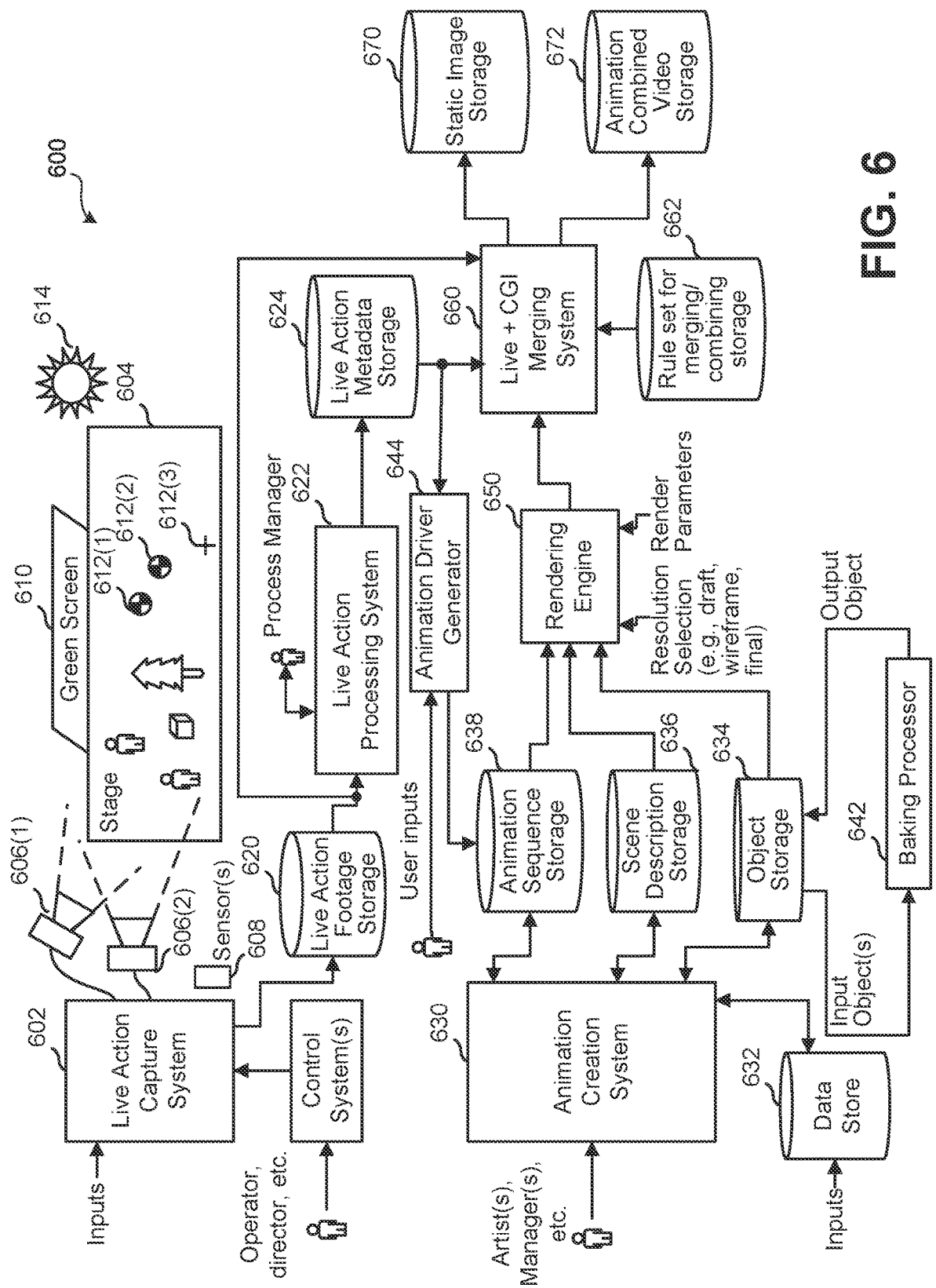
FIG. 6 illustrates an example visual content generation system as might be used to generate imagery in the form of still images and/or video sequences of images, according to various embodiments.

For example, FIG. 6 illustrates the example visual content generation system 600 as might be used to generate imagery in the form of still images and/or video sequences of images. Visual content generation system 600 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. Live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On stage 604, there might be human actors, animal actors, inanimate objects, background objects, and possibly an object such as a green screen 610 that is designed to be captured in a live scene recording in such a way that it is easily overlaid with computer-generated imagery. Stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, live action capture system 602 might output live action footage to a live action footage storage 620. A live action processing system 622 might process live action footage to generate data about that live action footage and store that data into a live action metadata storage 624. Live action processing system 622 might include computer processing capabilities, image processing capabilities, one or more processors, program code storage for storing program instructions executable by the one or more processors, as well as user input devices and user output devices, not all of which are shown. Live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 614, as that might be useful in post-processing to match computer-generated lighting on objects that are computer-generated and overlaid on the live action footage. Live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of visual content generation system 600. Animation creation system 630 might include computer processing capabilities, image processing capabilities, one or more processors, program code storage for storing program instructions executable by the one or more processors, as well as user input devices and user output devices, not all of which are shown. Animation creation system 630 might be used by animation artists, managers, and others to specify details, perhaps programmatically and/or interactively, of imagery to be generated. From user input and data from a database or other data source, indicated as a data store 632, animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 630 might be interactive, allowing a user to read in animation sequences, scene descriptions, object details, etc. and edit those, possibly returning them to storage to update or replace existing data. As an example, an operator might read in objects from object storage into a baking processor 642 that would transform those objects into simpler forms and return those to object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 632 might be used to drive object presentation. For example, if an artist is creating an animation of a spaceship passing over the surface of the Earth, instead of manually drawing or specifying a coastline, the artist might specify that animation creation system 630 is to read data from data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. Animation driver generator 644 might generate corresponding animation parameters to be stored in animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 622. Animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 650 might include computer processing capabilities, image processing capabilities, one or more processors, program code storage for storing program instructions executable by the one or more processors, as well as user input devices and user output devices, not all of which are shown.

Visual content generation system 600 can also include a merging system 660 that merges live footage with animated content. The live footage might be obtained and input by reading from live action footage storage 620 to obtain live action footage, by reading from live action metadata storage 624 to obtain details such as presumed segmentation in captured images segmenting objects in a live action scene from their background (perhaps aided by the fact that green screen 610 was part of the live action scene), and by obtaining CGI imagery from rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from rendering engine 650, and output an image where each pixel is a corresponding pixel from rendering engine 650 when the corresponding pixel in the live footage is a specific color of green, otherwise output a pixel value from the corresponding pixel in the live footage."

Merging system 660 might include computer processing capabilities, image processing capabilities, one or more processors, program code storage for storing program instructions executable by the one or more processors, as well as user input devices and user output devices, not all of which are shown. Merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of merging system 660, such as modifying boundaries of segmented objects, inserting blurs to smooth out imperfections, or adding other effects. Based on its inputs, merging system 660 can output an image to be stored in a static image storage 670 and/or a sequence of images in the form of video to be stored in an animated/combined video storage 672.

Thus, as described, visual content generation system 600 can be used to generate video that combines live action with computer-generated animation using various components and tools, some of which are described in more detail herein. While visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data that includes image data having shadow details generated using the methods described herein. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 7:
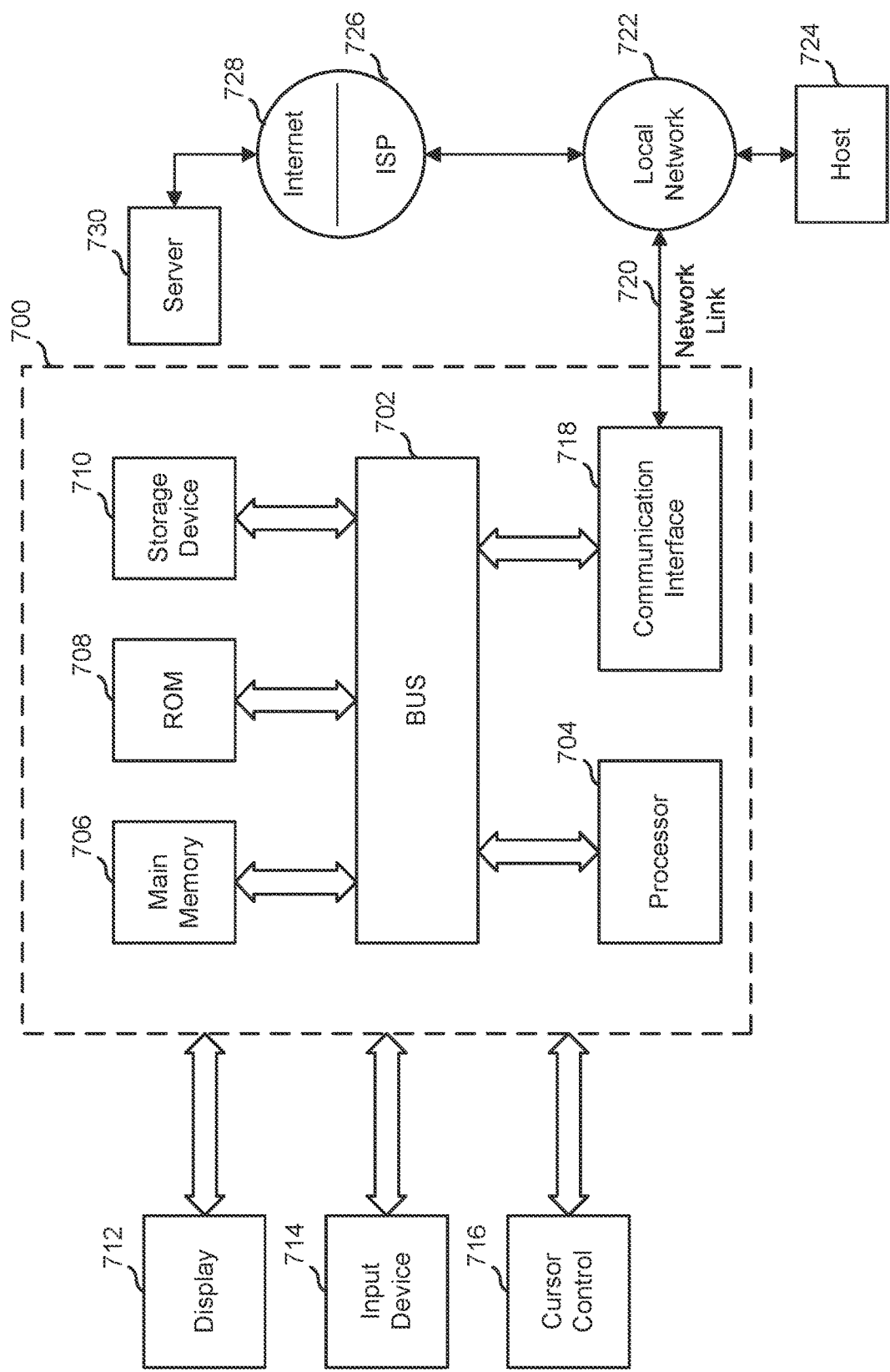
FIG. 7 is a block diagram illustrating an example computer system upon which computer systems of the systems illustrated in FIGS. 3 and 6 may be implemented.

For example, FIG. 7 is a block diagram that illustrates a computer system 700 upon which the computer systems of the systems described herein and/or visual content generation system 600 (see FIG. 6) may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 may also be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be a network card, a modem, a cable modem, or a satellite modem to provide a data communication connection to a corresponding type of telephone line or communications line. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through the Internet 728, ISP 726, local network 722, and communication interface 718. The received code may be executed by processor 704 as it is received, and/or stored in storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of processing textures to determine a sample of an image, the method comprising:
    under the control of one or more computer systems configured with executable instructions:
        receive a filter region representation, wherein the filter region representation comprises computer-readable data corresponding to a sample region of the image;
        determining a first texture dataset;
        determining a filter kernel for the filter region representation, the filter kernel corresponding to the sample region of the image, wherein the filter kernel comprises one or more kernel weights of the filter kernel over the sample region of the image;
        storing the filter kernel;
        determining a subset of the first texture dataset upon which the filter kernel is to be applied;
        storing a schedule of the subset, wherein the schedule specifies positions of texels within the first texture dataset;
        applying the schedule and the filter kernel to the first texture dataset to determine a first texture contribution for the sample region;
        determining a second texture dataset;
        applying the schedule and the filter kernel to the second texture dataset to determine a second texture contribution for the sample region; and
        combining the first texture contribution and the second texture contribution to determine an overall accumulated output for the sample region as the sample of the image.

2. The computer-implemented method of claim 1, wherein the first texture dataset or the second texture dataset comprises a plurality of levels of varying resolution and the schedule indicates which level or levels apply to the sample region.

3. The computer-implemented method of claim 2, wherein the plurality of levels of varying resolution comprises a MIP-map structure, a RIP-map structure, and/or a wavelet structure.

4. The computer-implemented method of claim 1, wherein the first texture dataset and/or the second texture dataset comprises a two-dimensional or a three-dimensional texture.

5. The computer-implemented method of claim 1, wherein a first subset of the first texture dataset and/or a second subset of the second texture dataset comprises one or more texture tiles of a predetermined size.

6. The computer-implemented method of claim 1, wherein the sample region is computed based on a mapping of a region a surface in a virtual scene represented by geometrical models.

7. The computer-implemented method of claim 1, wherein the filter region representation is determined based on a determined impact of applying the filter kernel across a range of tile vertices.

8. The computer-implemented method of claim 1, further comprising:
   accessing one or more texture tiles of one or more levels of varying resolution determined to correspond to a pixel region selected for filtering for the sample region; and
   applying at least one fitted filter to the accessed one or more texture tiles.

9. The computer-implemented method of claim 1, wherein the sample region is an ellipse.

10. The computer-implemented method of claim 1, wherein a fitted filter is a first fitted filter and a plurality of fitted filters are calculated and accumulated into a representation of the fitted filter in a cache and accumulating one or more tiles of one or more levels of varying resolution to access.

11. The computer-implemented method of claim 10, further comprising:
   accumulating a list of the one or more tiles to access for subsequent access of those one or more tiles.

12. The computer-implemented method of claim 1, further comprising generating a plurality of samples for a plurality of requests for samples and caching data values across requests.

13. The computer-implemented method of claim 12, further comprising grouping texture dataset requests across the requests.

* * * * *